United States Patent Office 2,987,139
Patented June 6, 1961

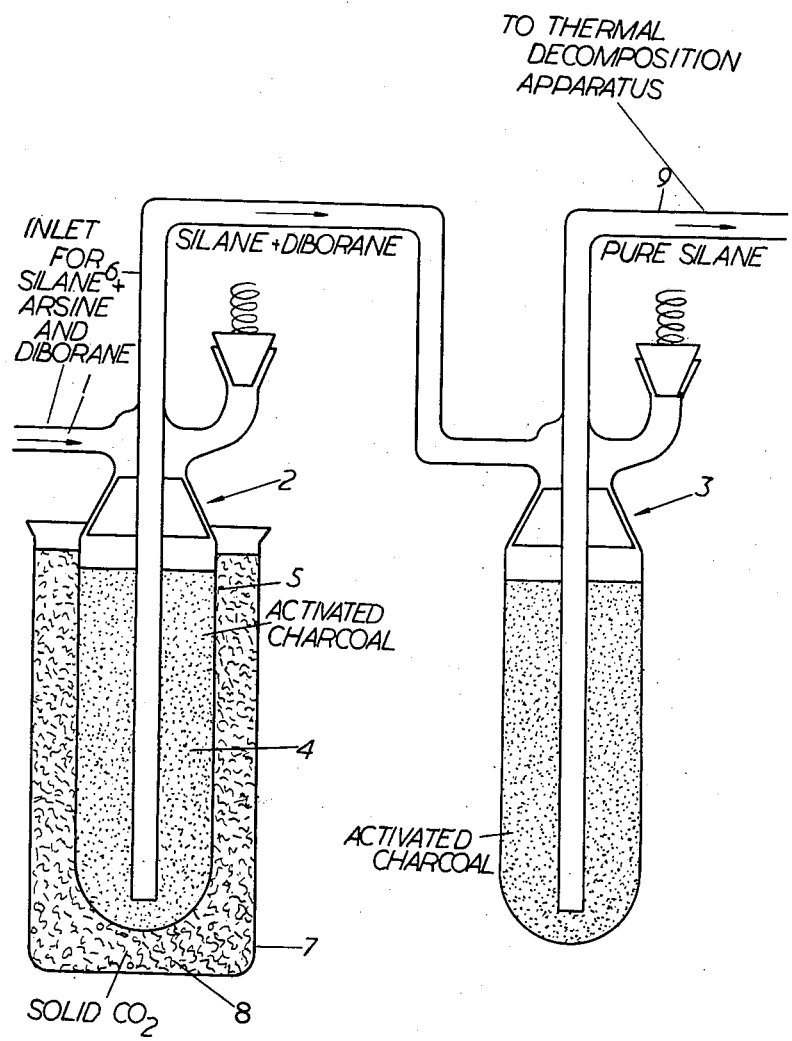

2,987,139
MANUFACTURE OF PURE SILICON
Eric Langley Bush, London, England, assignor to International Standard Electric Corporation, New York, N.Y., a corporation of Delaware
Filed Feb. 21, 1958, Ser. No. 716,652
Claims priority, application Great Britain Mar. 12, 1957
2 Claims. (Cl. 183—114.2)

This invention relates to the manufacture of pure silicon from silane and to the purification of the silane.

British patent specification No. 745,698 describes and claims a process of manufacture of substantially pure silicon which involves the thermal decomposition of silane. The most troublesome impurities in silicon are boron, arsenic and phosphorus and in order to prepare pure silicon by the decomposition of silane it is necessary that the silane should be freed from minute traces of other hydrides and particularly it should be freed from hydrides of boron, arsenic and phosphorus. In the process described in the above specification silane is passed through a decomposition purification stage to remove other hydrides.

The object of the present invention is to provide a more economical method of purifying silane used for the production of pure silicon.

It is known that many gases are adsorbed by activated charcoal and it is generally considered that such charcoal is more efficient as an adsorbent at low temperatures. Silane itself is adsorbed by activated charcoal and we have found that the differential rate of adsorption by activated charcoal at any particular temperature varies for different hydrides and also that the adsorption of other hydrides than silane in the presence of silane is not always more effective the lower the temperature.

We have found that, for the removal of arsine and phosphine from silane, activated charcoal is less efficient at room temperature than it is at —78° C. (the sublimation temperature of solid carbon dioxide) but that activated charcoal is less efficient in removing diborane from silane at —78° C. than it is at room temperature.

According to the present invention silane is purified by passage through two successive traps containing activated charcoal, one of these traps being maintained at a temperature of the sublimation of carbon dioxide and the other being at room temperature.

One form of apparatus for purifying silane according to the present invention is illustrated in the accompanying drawing.

Silane which may be contaminated wtih arsine, phosphine and diborane is drawn through inlet tube 1 and thence in succession through gas traps 2 and 3. The silane proceeds through activated charcoal 4 in gas trap 2. This activated charcoal 4 is contained in a vessel 5 and after passing downwards through the charcoal 4 the silane is led through an outlet tube 6 which extends nearly to the bottom of vessel 5.

The vessel 5 is supported in an outer vessel 7 containing solid carbon dioxide 8 which completely surrounds that portion of the vessel 5 containing activated charcoal. The vessel 5 is thus maintained at a temperature of —78° C. Arsine and phosphine are adsorbed by activated charcoal at this temperature but diborane is not adsorbed to any considerable extent at this temperature.

The outlet tube accordingly communicates with a second gas trap 3 similar in all respects to gas trap 2 except that gas trap 3 is kept at room temperature and at this temperature diborane is adsorbed by the activated charcoal in gas trap 3 so that pure silane passes through the outlet 9 and goes to the chamber in which it is decomposed in the manner described and claimed in Specification 745,698.

Although in the embodiment described above, silane is first passed through the low temperature trap and then through the trap at room temperature the order may be reversed, the silane being passed first through the trap at room temperature and then through the trap at the temperature of solid carbon dioxide. There is a slight advantage in this last mentioned arrangement in that impurities present in the activated charcoal of the first trap that may be swept out with the silane are removed in the trap maintained at solid carbon dioxide temperature.

When the activated charcoal in either of the gas traps 2 or 3 becomes sufficiently poisoned by the adsorbed gases as to lose its effectiveness it may be reactivated by exposing it to the temperature at which the other gas trap has hitherto been subjected. Thus to reactivate the charcoal in the two gas traps, the two are disconnected from one another and the flow of silane stopped. The vessel used in gas trap 3 is then placed in the solid carbon dioxide in vessel 8. Diborane is liberated and after a time the charcoal becomes re-activated. Similarly the vessel 5 after disconnection from the input and output tubes is exposed to room temperature, arsine and phosphine are liberated and the charcoal re-activated.

Alternatively, however, the carbon in both traps may be reactivated by heating to 200° C. and passing argon through the charcoal whilst it is maintained at that temperature.

Either method of reactivation may be continued until analysis of the escaping gas shows no detectable trace of the absorbed impurities.

The two gas traps may then be reconnected as shown and used again for the purification of silane.

The silane thus purified is then thermally decomposed to produce silicon, preferably by the method described and claimed in Specification 745,698. The thermal decomposition purification stage to remove hydrides of born, arsenic and phosphoruse is not, however, necessary.

Although it has been stated above that one of the traps is maintained at the temperature of sublimation of carbon dioxide (—78° C.) this temperature may be varied within 10° C. each way.

Similarly room temperature is to be taken as being any temperature between 0° C. and 30° C.

While the principles of the invention have been described above in connection with specific embodiments, and particular modifications thereof, it is to be clearly understood that this description is made only by way of example and not as a limitation on the scope of the invention.

What I claim is:

1. Process of removing hydrides of boron, arsenic and phosphorus from silane which comprises passing silane through two successive traps containing activated charcoal, one of said traps being maintained at a temperature between —68° C. and —88° C. and the other trap being maintained at a temperature between 0° C. and 30° C.

2. The process according to claim 1, wherein the silane is passed first through said trap maintaned at the temperature between 0° C. and 30° C.

References Cited in the file of this patent

UNITED STATES PATENTS

| | | |
|---|---|---|
| 1,667,426 | Lourens | Apr. 24, 1928 |
| 1,825,707 | Wagner | Oct. 6, 1931 |

(Other references on following page)

FOREIGN PATENTS 745,698  Great Britain _____ Feb. 29, 1956

OTHER REFERENCES

Mantell: "Adsorption," 2nd ed., 1951, pp. 146, 147, 278.

Garner: "Natural Gas," vol. V, page 46 (1924).

Schechter et al.: "Boron Hydrides and Related Compounds," prepared under Contract NOa(s) 10992 for Dept. of Navy, prepared by Callery Chemical Co., printed March 1951, declassified December 1953, page 108.

Mantell: "Industrial Carbon," 2nd ed. 1946, page 153.